United States Patent [19]

Graham

[11] Patent Number: 4,887,020

[45] Date of Patent: Dec. 12, 1989

[54] SELF-COMPENSATING BRUSHLESS ALTERNATOR

[75] Inventor: Gary R. Graham, Adelaide, Australia

[73] Assignee: U.S. Philips Corporation, New York, N.Y.

[21] Appl. No.: 113,934

[22] Filed: Oct. 27, 1987

Related U.S. Application Data

[63] Continuation of Ser. No. 633,073, Jul. 23, 1984, abandoned, which is a continuation of Ser. No. 289,257, Aug. 3, 1981, abandoned.

[51] Int. Cl.[4] .......................... H02P 9/14; H02K 21/04
[52] U.S. Cl. ........................................ 322/63; 310/183; 310/198
[58] Field of Search .................... 322/28, 63–66, 322/89; 310/112, 183, 198

[56] References Cited

U.S. PATENT DOCUMENTS

| | | | |
|---|---|---|---|
| 3,512,074 | 5/1970 | Soper | 322/63 X |
| 4,383,215 | 5/1983 | Frister | 322/28 X |
| 4,442,396 | 4/1984 | Hucker | 322/28 X |
| 4,633,160 | 12/1986 | Graham | 322/28 X |
| 4,654,551 | 3/1987 | Farr | 310/112 |

Primary Examiner—R. J. Hickey

[57] ABSTRACT

A self-excited brushless alternator having a rotating field winding excited by an alternating current exciter whose rotating armature rotates with the rotating field winding and is permanently connected to the field winding via a field rectifier also mounted to rotate with the field winding. The exciter has an exciter stator primary winding and a rotary exciter secondary winding connected via a rotray field rectifier to the rotary main field winding of the alternator. The primary excitation for the exciter is derived, via magnetic coupling, from a rotary auxiliary magnetic field produced by a feedback winding in series with the main field winding and rotating herewith. A common magnetic circuit couples the rotary feedback winding with an auxiliary stator secondary winding and the exciter primary and secondary windings. The common magnetic circuit has a common stator core having the exciter primary winding and the auxiliary secondary winding thereon and a common rotor core having the exciter secondary winding and the feedback winding thereon. In operation a pole group having either K or NK feedback or exciter pole pairs is formed with poles uniformly disposed around the rotor or stator core, the ratio of feedback pole pairs to exciter pole pairs being either K to NK or NK to K, where K is any number and N is an even number. Either the feedback winding or the exciter primary winding, forming the pole group having K pole pairs have one or more first winding portions wounds for generating the poles of that group whereby the net change or magnetic flux linking with each first winding portion and due to the pole group having NK pole pairs is substantially zero.

6 Claims, 3 Drawing Sheets

SELF-COMPENSATING BRUSHLESS ALTERNATOR

BACKGROUND OF THE INVENTION

The present invention relates to self-excited alternators of the brushless type, having a rotating field which is excited by an alternating current exciter whose rotating armature is mounted to rotate with, and is permanently connected to the field winding of the alternator via field rectifier means also mounted to rotate with the field winding. The exciter has one or more exciter stator primary windings and one or more rotary exciter secondary windings connected via rotary field rectifier means to the rotary main field winding of the alternator. Primary excitation direct current for the exciter is derived, via magnetic coupling, from a rotary auxiliary magnetic field produced by a feedback winding connected in series with the main field winding and mounted to rotate therewith.

Australian Patent Application No. 37930/85 describes such a construction wherein the primary excitation current is derived by rectification of the current induced into an auxiliary stator secondary winding located within the auxiliary magnetic field. The magnetic circuit coupling the rotary feedback winding with the auxiliary stator secondary winding is common with that of the exciter.

With such a construction, efficient exciter primary to exciter secondary power transfer is important as well as efficient transfer of power between the feedback winding or windings and auxiliary stator secondary winding or windings.

Effective operation of such a self-excited alternator may be adversely affected by undesired voltages induced into the exciter primary winding by the magnetic field of the feedback winding, into the feedback winding by the magnetic field of the exciter primary winding, into the exciter secondary winding by the influence of the magnetic field of the feedback winding upon the magnetic field of the exciter primary winding, and/or into the feedback secondary winding by the influence of the magnetic field of the exciter primary winding upon the magnetic field of the feedback winding.

SUMMARY OF THE INVENTION

With a self-excited alternator in accordance with the present invention, the common magnetic circuit comprises a common stator core on which the exciter primary winding and the feedback secondary winding are provided and a common rotor core on which the exciter secondary winding and the feedback winding are provided. The rotor core is so shaped and the feedback winding is so provided thereon that in operation a pole group having either K or NK feedback pole pairs is formed with poles uniformly disposed around the rotor core. The stator core is so shaped and the exciter primary winding is so provided thereon that in operation a pole group having either NK or K exciter pole pairs are formed with poles uniformly disposed around the stator core. The ratio of feedback pole pairs to exciter pole pairs is either K to NK or NK to K, where K is any number and N is an even number. Either the feedback winding or the exciter primary winding, as the case may be, for forming the pole group having K pole pairs includes one or more first winding portions wound for generating the poles of that group. Thus, with rotation of the rotor core relative to the stator core, the net change of magnetic flux linking with each first winding portion and due to the pole group having NK pole pairs is substantially zero.

Since the net change of magnetic flux linking with each first winding portion and due to the pole group having NK pole pairs is substantially zero, no undesirable voltages are induced into the respective first winding portions and thus no undesirable voltages are induced into the winding for forming the pole group having K pole pairs by the magnetic field due to the pole group having NK pole pairs.

Preferably, the winding for forming the pole group having NK pole pairs includes a plurality of second winding portions wound for generating the poles of that group in such a manner that each pole is energized by one or more second winding portions. The plurality of second winding portions are in pairs of serially-connected matched winding portions, respective second winding portions of each such pair being wound for generating different pole-pairs of that group so disposed in relation to each other that, with rotation of the rotor core relative to the stator core, voltages induced into respective second winding portions of each such pair due to the magnetic field of the pole group having K pole pairs are equal and in anti-phase and thereby mutually cancel across each such pair. With such second winding portions so wound and arranged in a plurality of such pairs, there is cancellation of voltages induced by the magnetic field due to the pole group having K pole pairs into the winding for forming the pole group having Nk pole pairs.

In this way, depending upon whether the feedback winding in association with the rotor core forms the pole group having K pole pairs or forms the pole group having NK pole pairs, either no voltages are induced therein by the magnetic field due to the exciter pole pairs or alternatively a cancellation of induced voltages occurs. Likewise, depending upon whether the exciter primary winding in association with the stator core forms the pole group having K pole pairs or forms the pole group having NK pole pairs, either no voltages are induced therein by the magnetic field due to the feedback pole pairs or alternatively a cancellation of induced voltages occurs.

Where the feedback winding in association with the rotor core forms the pole group having K pole pairs, preferably the stator core is shaped so as to define K similar flux paths uniformly disposed around the stator core for providing flux linkage between opposite poles of the K feed-back pole pairs and the auxiliary stator secondary winding. The auxiliary stator secondary winding includes one or more auxiliary secondary winding portions each so coupled to a flux path that an alternating voltage is induced into each auxiliary secondary winding portion upon rotation of the rotor core relative to the stator core due to the magnetic field of the pole group having K feedback pole pairs. The net change of magnetic flux linking with each auxiliary secondary winding portion and due to the pole group having NK exciter pole pairs is substantially zero. In the case of more than one auxiliary winding portion, the winding portions may be connected in series with each other so that the alternating voltage V induced into each other respective winding portion reinforce each other in the auxiliary winding. Alternatively, the winding portions may be connected in parallel so that the alternating currents induced in respective winding portions reinforce each other.

Where the feedback winding in association with the said rotor core forms the pole group having NK pole pairs, preferably the stator core is shaped so as to define NK similar flux paths uniformly disposed around the stator core to provide flux linkage between opposite poles of the NK feedback pole pairs and the auxiliary stator secondary winding. The auxiliary stator secondary winding includes a plurality of pairs of serially-connected matched auxiliary winding portions, respective auxiliary winding portions of each such pair being coupled to one or more given flux paths so disposed in relation to each other that, with rotation of the rotor core relative to the stator core, alternating voltages induced into respective auxiliary winding portions by magnetic flux due to the feedback pole pairs are mutually reinforcing. Variations of the total magnetic flux strength in each given flux path owing to the alternate weakening and strengthening of magnetic flux due to the NK feedback pole pairs by magnetic flux due to the K exciter pole pairs produces equal and opposite voltage variations in respective matched auxiliary winding portion of each such pair which mutually cancel across each such pair. Such pairs of serially-connected matched auxiliary winding portions may be connected in series or in parallel with each other so that alternating voltages or currents induced by magnetic flux due to the feedback pole-pairs reinforce each other in the auxiliary secondary winding.

Where the excited primary winding in association with the stator core forms the pole group having K pole pairs, preferably the rotor core is shaped so as to define K similar flux paths uniformly disposed around the rotor core for providing flux linkage between opposite poles of the K exciter pole pairs and the exciter secondary winding. The exciter secondary winding includes one or more exciter secondary winding portions each so coupled to a flux path that an alternating voltage is induced into each exciter secondary winding portion upon rotation of the rotor core relative to the stator core due to the magnetic field of the pole group having K exciter pole pairs. The net change of magnetic flux linking with each exciter secondary winding portion and due to the pole group having NK feedback pole pairs is substantially zero. In the case of more than one exciter secondary winding portion, the winding portions may be connected in series with each other so that the alternating voltages induced into each respective winding portion due to the magnetic field of the exciter pole pairs reinforce each other in the exciter secondary winding. Alternatively, the winding portions may be connected in parallel so that the alternating currents induced into respective winding portions reinforce each other.

Where the exciter primary winding in association with the stator core forms the pole group having NK pole pairs, preferably the rotor core is shaped so as to define NK similar flux paths uniformly disposed around the rotor core for providing flux linkage between opposite poles of the NK feedback pole pairs and the exciter secondary winding. The exciter secondary winding includes a plurality of pairs of serially-connected matched exciter secondary winding portions, respective exciter secondary winding portions of each such pair being coupled to one or more given flux paths so disposed in relation to each other that, with rotation of the rotor core relative to the stator core, alternating voltages induced into respective exciter secondary winding portions by magnetic flux due to the exciter pole pairs are mutually reinforcing. Variations of the total magnetic flux strength in each given flux path owing to the alternate weakening and strengthening of magnetic flux due to the NK exciter pole pairs by magnetic flux due to the N exciter pole pairs produces equal and opposite voltage variations in respective matched auxiliary winding portions of each such pair which mutually cancel across each such pair. Here, such pairs of serially-connected matched exciter secondary winding portions may be connected in series or in parallel with each other so that alternating voltages or currents induced by magnetic flux due to the exciter pole pairs reinforce each other in the exciter secondary winding.

DETAILED DESCRIPTION OF THE INVENTION

Figure 1:
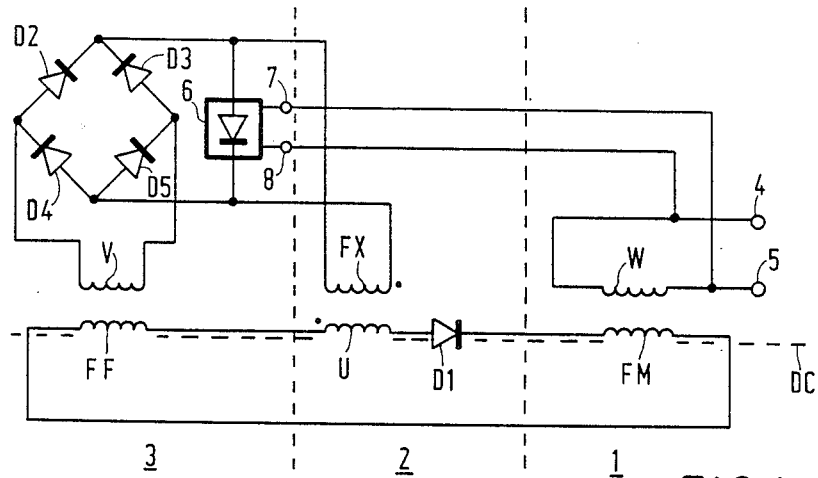
FIG. 1 is schematic circuit diagram of a self-excited brushless alternator in accordance with the invention.

The single-phase brushless alternator of FIG. 1 comprises an output section 1, an exciter section 2 and a feedback section 3 which are accomodated in an alternator housing which is not shown in the figure. The main field winding FM, the exciter secondary winding U and the feedback winding FF are all mounted on a rotor constructed so as to be rotated from a driving source about an axis within the housing and symbolized by the dotted line DC. Stationary windings W, FX and V are respectively located within the alternator housing so that the winding W functions as a single-phase output winding magnetically coupled with the main field winding FM, the winding FX functions as an exciter primary winding coupled with the exciter secondary winding U and the winding V functions as a feedback secondary winding magnetically coupled with the feedback primary winding FF.

The rotor on which the windings FM, U and FF are mounted comprises a first rotor core on which the exciter secondary winding U and the feedback winding FF are provided and a second rotor core on which the main field winding FM is provided. The first and second rotor cores are spaced apart axially from each other on a driving shaft and each rotor core is made up of a stack of rotor laminations stamped out of ferromagnetic material sheeting to form disks having a series of inwardly-extending radial slots via which the windings are provided on the respective rotor cores. The first rotor core is associated with a first stator core within which it rotates and the second rotor core is associated with a second stator core within which it rotates with the exciter primary winding FX and the feedback secondary winding V being provided on the first stator core and the output winding W being provided on the second stator core. In somewhat similar manner to the rotor core, each stator core is made of a stack of stator laminations likewise stamped out of ferro magnetic material sheeting in this case to form disks having a central aperture for accomodating the associated rotor core and from which radial slots extend via which windings are provided on the respective stator cores.

The first and second stator cores are fixedly mounted relative to each other and are spaced apart so as to be respectively aligned with the first and second rotor cores. The laminations forming the respective rotor cores are dimensioned relative to the laminations forming their associated stator cores so that each rotor core is able to rotate within its associated stator core with a narrow air gap separating each rotor core from its associated stator core. Accordingly, the main field winding FM is magnetically coupled with the output winding W by way of the second rotor core and the second stator core whereas by way of the first rotor core and the first stator core the exciter primary winding FX is magnetically coupled with the exciter secondary winding U and also the primary feedback winding FF is magnetically coupled with the secondary feedback winding V.

The exciter section 2 operates as a conventional generator wherein a primary magnetic field set up by the winding FX results in generation of a voltage in the winding U which is connected to the main field winding FM via a rectifier D1. The primary winding FF of the feedback section 3 is connected in series with the main field winding FM across the series combination of the winding U and rectifier D1. By means of a full-wave rectifier system constituted by rectifiers D2, D3, D4 and D5, the secondary feedback winding V of the feedback section 3 is connected to supply excitation current to the exciter primary winding FX. Alternator output terminals 4 and 5 are connected to opposite ends of the single-phase output winding W. The exciter primary winding FX is shunted by a controlled bypass circuit 6 having a pair of input terminals 7 and 8 which are connected across the alternator output terminals 4 and 5. The bypass circuit 6 is sensitive to the magnitude of the alternator outpput voltage present across the output terminals 4 and 5. Below a predetermined magnitude of alternator output voltage, the bypass circuit 6 is non-conductive but above that predetermined magnitude the bypass circuit 6 presents a low-impedance path in shunt with the winding FX thereby reducing the magnitude of the primary excitation current flow through the winding FX. The bypass circuit 6 may take any one of a variety of different forms.

Operation of the brushless alternator of FIG. 1 is generally similar to that of the brushless alternators described in the afore-mentioned patent specification for Australian Patent Application No. 37930/85 and briefly its operation is as follows.

Owing to the residual magnetism of stationary parts of the alternator, when the alternator rotor is driven a small voltage is generated across the winding U which causes a small rectified current to flow in the windings FM and FF. Current through the winding FF produces a magnetic field Mr which is fixed relative to the rotor. As the magnetic field Mr moves relative to the stationary winding V, a voltage directly proportional to the level of the current in the winding FF is generated across the winding V. The alternating voltage developed across the winding V is fed to the rectifier bridge composed of the rectifiers D2–D5 and the rectified output of the bridge is supplied as excitation current to the exciter primary winding FX.

Movement of the rotor within the exciter field produced by the current flow in the winding FX results in increased voltages being produced across the winding U and rectification of this voltage by the rectifier D1 causes a flow of direct current in the main field winding FM and also in the feedback winding FF. The magnetic flux due to the flow of the rectified current in the rotary main field winding FM causes an alternating voltage to be produced across the single-phase output winding W and the simultaneous flow of rectified current through the winding FF further increases the strength of the magnetic field Mr.

The winding V is designed so that its output voltage is slightly in excess of the voltage required to maintain the excitation current in the winding FX. In this way, a build-up of excitation current and of the alternator terminal voltage is ensured.

It will be appreciated that the strength of the stationary magnetic field of the exciter section 2 of the alternator determines the level of the voltage generated across the winding U and hence determines the level the rectified voltage developed across the windings FM and FF and the level of the alternating output voltage produced across the terminals 4 and 5.

The controlled bypass circuit 6 functions as a monitoring circuit provided for the purpose of limiting the alternator terminal voltage build-up to a predetermined level. So long as the voltage produced across the terminals 4 and 5 is below a predetermined alternator output voltage level there is no current flow via the bypass circuit 6. However, when the predetermined alternator output voltage is exceeded, the resultant flow of current via the bypass circuit 6 causes a reduction in the flow of excitation current in the winding FX. Accordingly, the maximum level of the alternator terminal voltage developed across the terminals 4 and 5 is governed inter alia by the characteristics of the controlled bypass circuit 6. Those characteristics should be chosen to suit the terminal voltage required.

The feedback system from the output section 1 to the exciter primary winding FX via the feedback alternator section 3 acts to increase or decrease the excitation level produced by the winding FX in accordance with variations of the load across the output terminals 4 and 5.

Owing to electro magnetic induction, any load changes across the output terminals 4 and 5 of the alternator of FIG. 1 are accompanied by an immediate change of current flow in the winding FM. That is to say, in response to load changes affecting the magnetic field due to the winding FM, current will be induced into the winding FM having a direction such as to neutralize the change of magnetic flux. Thus, a step increase in the load across the terminals 4 and 5 promotes a step increase of the current in the winding FM. The magnitude of the change of current winding FM is directly related to the change of load or power factor and simultaneously a corresponding change in the magnetic field Mr of the winding FF and of the alternating voltage developed across the winding V are produced thereby changing the current through the winding FX and changing the excitation required to maintain a new level of current flow through the winding FM. In this way, the required excitation for any load condition regardless of magnitude or power factor, is generated by the feedback system of the alternator of FIG. 1 so that regulation over wide variation of alternator load and power factor may be achieved in accordance with the teachings of the aforementioned patent specification of Australian Patent Application No. 37930/85.

As previously mentioned, the exciter primary winding FX is magnetically coupled with the exciter secondary winding U by way of the first stator core and the first rotor core and the primary feedback winding FF is magnetically coupled with the secondary feedback winding V also by way of the first stator core and the first rotor core.

Since a common magnetic circuit in the form of the first rotor core and the first stator core is shared for the transfer of power from the exciter primary winding FX to the exciter secondary winding U and for the transfer of power in the reverse direction from the feedback primary winding FF to the feedback secondary winding V there is the possible drawback of extraneous voltages being induced into the winding FF from the winding FX and/or of extraneous voltages being induced into the winding FX from the winding FF. Such extraneous voltages could lead to unstable operation of one or more of the alternator sections 1, 2 and 3. There is moreover, the further possible drawback of the strength of the magnetic field set up by the exciter primary winding FX being reduced by the magnetic field set up by the feedback winding FF thereby weakening the main field produced by the winding FM and reducing the overall efficiency of the alternator.

In accordance with the invention, the first stator core and the first rotor core are so constructed and the respective windings are so provided thereon as to minimize the aforesaid possible drawbacks or their effects.

Figure 2:
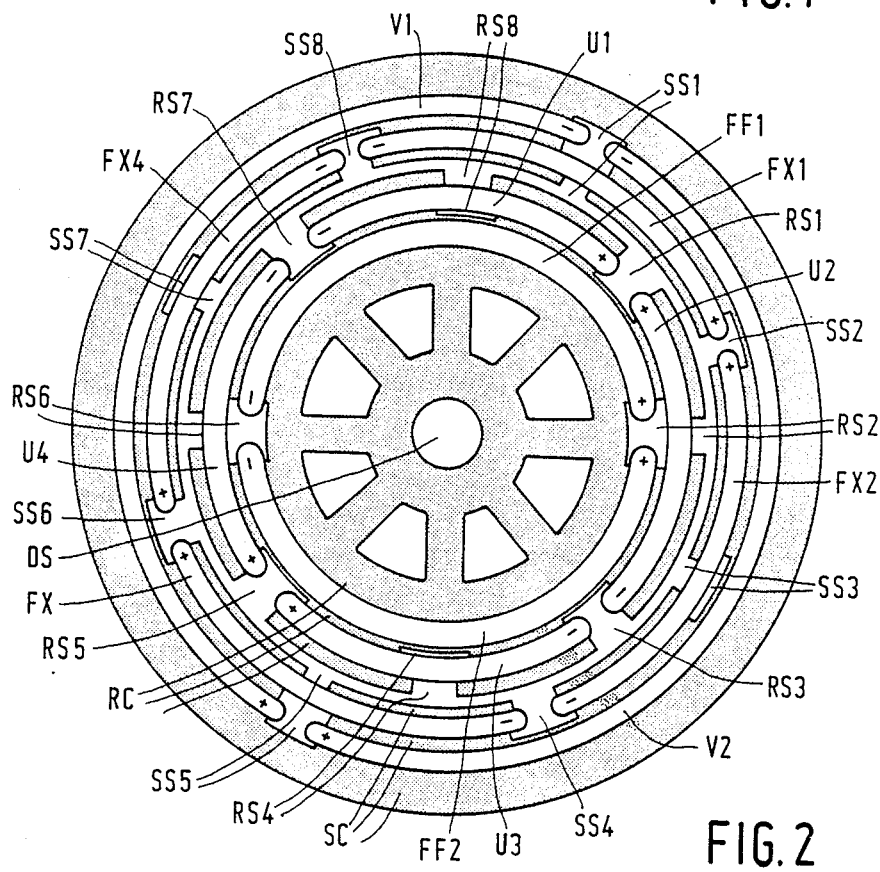
FIG. 2 is a diagramatic cross-section of a common stator core in combination with a common rotor core forming part of the self-excited brushless alternator of FIG. 1.

FIG. 2 is a diagramatic cross-section illustrating an end view showing construction of the first stator core and of the first rotor core and the manner in which the windings FF, V, FX and U are provided thereon.

In FIG. 2, the first stator core is denoted by the letters SC and the first rotor core is denoted by the letters RC. In a conventional manner, the rotor core RC is made up of a stack of identical rotor laminations of ferro magnetic material clamped together to form the core which is rigidly mounted on the driving shaft DS journalled to the alternator housing (not shown) by means (not shown), each rotor laminations having the shape indicated by the Figure so that the rotor core RC has eight radial slots or channels RS1 to RS8 which each extend the whole length of the rotor core RC. Each of the radial slots RS1 to RS8 has a widened portion for the accomodation of windings on the rotor core RC and it is to be noted that the slots RS2 and RS6, which are located diametrically opposite to each other, are deeper than the remaining slots on the rotor core RC.

Also in a conventional manner, the stator core SC is made of a stack of identical stator laminations of similar ferro magnetic material clamped together to form the stator core which is fixedly mounted within the alternator housing by mounting means (not shown). Each stator lamination has the shape indicated by the figure so that the stator core SC has eight radial slots or channels SS1 to SS8 which extend for the full length of the stator core SC. Again, each of the slots SS1 to SS8 has a widened portion for the accomodation of windings on the stator core SC and in this case it is to be noted that the slots SS1 and SS5, which are located diametrically opposite to each other, are deeper than the remaining slots on the stator core SC. The laminations of the rotor core RC are dimensioned relative to those of the stator core SC that a narrow air gap AG separates the rotor core RC from the stator core SC and by rotation of the driving shaft DS the rotor core RC is able to freely rotate withint the stator core SC.

In FIG. 2, the primary feedback winding FF is formed by two winding portions FF1 and FF2, each winding portions being formed by a corresponding number of turns of insulated copper wire wound on the rotor core RC in a conventional manner between slots RS2 and RS6. The winding sense of each of the winding portion FF1 and FF2 is indicated by the + and − signs shown at each extremity of the winding portions FF1 and FF2 respectively shown in the figure. Accordingly, in operation, the flow of direct current in the winding FF produces a single pair of magnetically opposite poles located diametrically opposite to each other on the stator core SC adjacent the air gap AG and centered on an imaginary polar axis running approximately through the diametrically opposite slots RS8 and RS4.

The winding portions FF1 and FF2 are connected in series with each other but if required may alternatively be connected in parallel provided the winding sense indicated is maintained. The primary excitation winding FX is formed by four winding portions FX1, FX2, FX3 and FX4, each winding portion being formed by a corresponding number of turns of insulated copper wire wound on the stator core SC in a conventional manner respectively between the slots SS8 and SS2, the slots SS2 and SS4, the slots SS4 and SS6 and between the slots SS6 and SS8. Similarly here, the winding sense of each of the winding portion FX1, FX2, FX3 and FX4 is indicated by the + and − signs shown in the figure at the extremity of the winding portion in question. Accordingly, in operation, the flow of direct current in the winding FX produces two pairs of opposite magnetic poles with the respective poles uniformly distributed around the stator core SC adjacent the air gap AG with like magnetic poles being located diametrically opposite to each other and centered on imaginary polar axes running approximately through the slots SS1, SS3, SS5 and SS7. Here, the winding portions FX1 FX2, FX3 and FX4 are connected in series with each other. As an alternative, the winding portions FX1 and FX3 may be connected in series to form a series combination and the winding portions FX2 and FX4 may be connected in series with each other to form another series combination, the two series combinations so formed being connected in parallel. As a further alternative, the winding portions FX1 and FX2 may be connected in series to form a series combination and the winding portions FX3 and FX4 may be connected in series to form another series combination, the two series combinations so formed being connected in parallel. In every case the winding sense indicated is maintained.

The exciter secondary winding U is formed by four winding portions U1, U2, U3 and U4, each winding portion being formed by a corresponding number of turns of insulated copper wire wound on the rotor core RC in a conventional manner respectively between the slots RS7 and RS1, the slots RS1 and RS3, the slots RS3 and RS5 and between the slots RS5 and RS7, the winding sense of each of the winding portion being shown by the + and − signs shown in the figure as previously described. The winding portions U1, U2, U3 and U4 are connected in series. However, as an alternative, the winding portions U1 and U3 may be serially connected to form one series combination with the winding portions U2 and U4 serially connected to form another series combination, the two series combinations so formed being connected in parallel. As a further alternative, the winding portions U1 and U2 may be serially connected to form one series combination with the winding portions U3 and U4 serially connected to form another series combination, the two series combinations so formed being connected in parallel. In every case, the winding sense indicated is maintained.

The feedback secondary winding V is formed by two winding portions V1 and V2, each winding portion being formed by a corresponding number of turns of insulated copper wire wound on the stator core SC in a conventional manner respectively between the slots SS1 and SS5, the winding sense of each of the winding portion being shown by + and − signs as previously described. The winding portions V1 and V2 are connected in series. Provided the proper winding sense is maintained, the winding portions V1 and V2 may alternatively be connected in parallel.

With the arrangement depicted by FIG. 2, it will be appreciated that in operation, with the rotation of the rotor core RC, a rotating magnetic field due to the single pole pair produced by the winding portions FF1 and FF2 of the primary feedback winding FF will induce an alternating voltage into winding portions V1 and V2 and that a stationary magnetic field due to the two pole pairs produced by the winding portions FX1, FX2, FX3 and FX4 will cause an alternating voltage, having twice the frequency to be induced into the winding portions U1, U2, U3 and U4. The magnitude of the respective alternating voltages so induced affect the overall operation of the self-excited alternator of FIG. 1 and are dependent upon the respective magnitudes of the direct current flowing respectively in the primary feedback winding FF and in the primary exciter winding FX.

Accordingly, as previously indicated, it is desirable that the magnitude of the direct current flow in the primary feedback winding FF is not affected by extraneous voltages which may be induced by the magnetic field produced by the primary exciter winding FX and that the magnitude of direct current flow in the primary exciter winding FX is not affected by extraneous voltages which may be induced by the magnetic field produced by the primary feedback winding FF. It is also important that the transfer of the energy from the primary exciter winding FX to the secondary exciter winding U is not reduced by the magnetic field due to the primary feedback winding FF.

With an arrangement as depicted by FIG. 2, there is one half the number of magnetic poles due to the feedback primary FF as there magnetic poles due to the exciter primary winding FX. As a result, with rotation of the rotor core RC relative to the stator SC, since the magnetic field across the air gap AG due to the exciter primary winding FX has four poles (two pole pairs), there is no net change in the magnetic flux due to the exciter primary winding FX linking with the two winding portions of the primary feedback winding FF and thus no extraneous voltage is produced in the winding FF. On the other hand, since the magnetic field across the air gap AG due to the primary feedback winding FF has two poles (a single pole pair), magnetic flux due to the feedback winding FF, with rotation of the rotor core RC relative to the stator core SC, always links with two different winding portions of the exciter primary winding FX, which two different winding portions are wound in the opposite sense, and are in series with each other with the nett result that extraneous voltages induced into the winding portion of the winding FX cancel out. The manner in which the cancellation of such extraneous voltages occurs is further explained by way of FIG. 3 of the accompanying drawings.

Figure 3A:
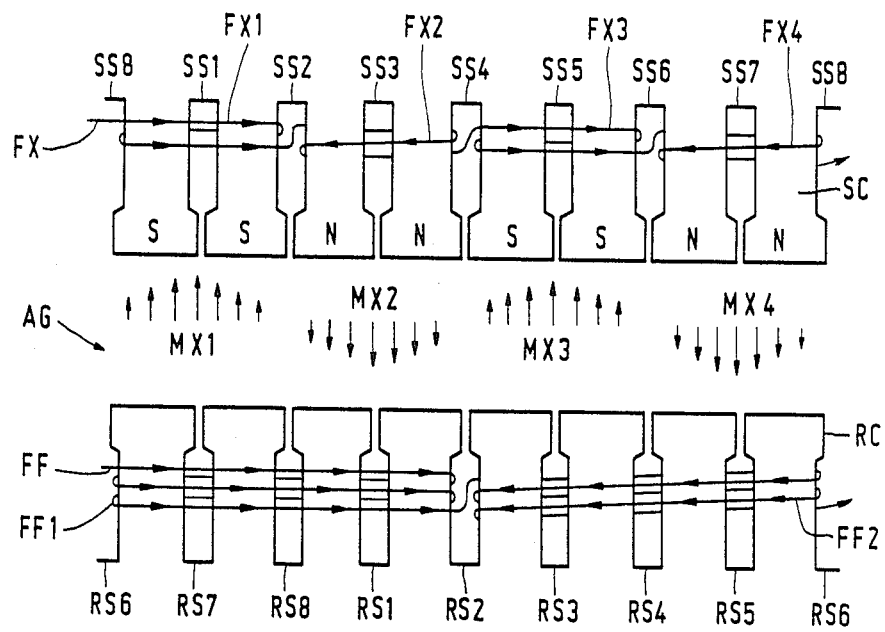
FIGS. 3a, 3b and 5 are diagrams for explaining the operation of the self-excited brushless alternator of FIGS. 1 and 2.
Figure 3B:
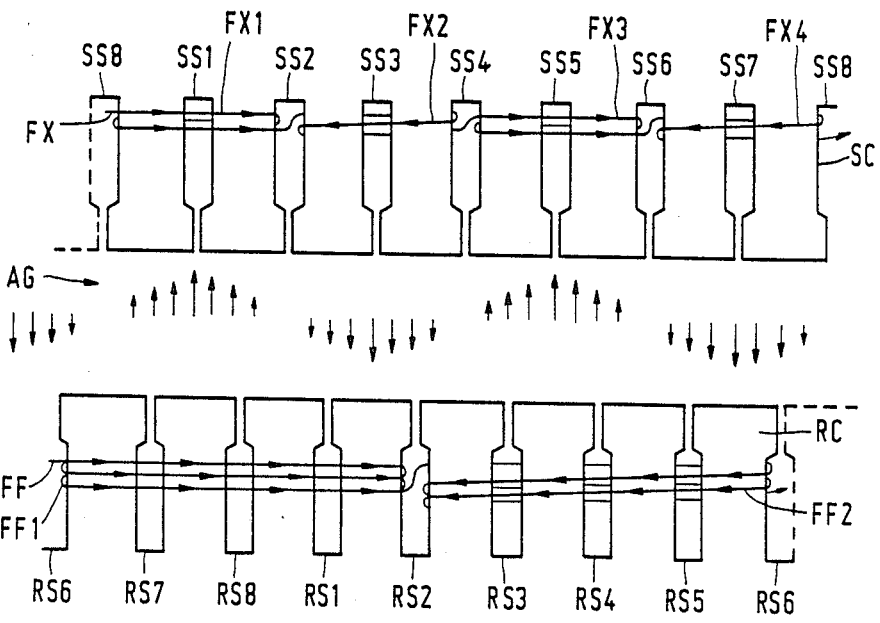

FIGS. 3a and 3b diagrammatically illustrate the relationships between the feedback winding FF and the magnetic field produced by the exciter primary winding FX. Referring now to FIGS. 3a and 3b, for ease of description a relevant part of the stator core SC is depicted in an exaggerated form with its inner circumference shown as being in a straight line (which is not, in fact, the case). A relevant part of the rotor core RC is also depicted in an exaggerated form with its outer circumference shown as a straight line (which also is not the case) and the air gap AG between the stator core SC and the rotor core RC is shown with exaggerated width relative to the size of the stator core SC and the rotor core RC. In both parts of FIG. 3, the relative winding sense of the winding portions FX1, FX2, FX3 and FX4 of the exciter primary winding FX on the stator core SC is shown and likewise the relative winding sense of the winding portions FF1 and FF2 of the feedback winding FF on the rotor core RC are shown. It is assumed the rotor core RC moves at a constant speed relative to the stator core SC in the direction indicated by the arrow A.

FIG. 3a shows the relative position of the rotor core RC and the stator core SC at a particular instant of time with the slot SS8 aligned with the slot RS6 whereas FIG. 3b shows the relative position of the rotor core RC and the stator core SC at a subsequent instant of time in which the rotor core RC has moved so that the slot RS6 is aligned with a point mid-way between the slots SS7 and SS8.

The direction and strength of the magnetic field generated in the air gap AG due to energization of the exciter primary winding FX at distributed points along the air gap AG is denoted by the groups of arrows MX1, MX2, MX3 and MX4. It will be appreciated that by energization of the exciter primary winding FX, at the air gap AG adjacent each of the winding portions FX1 and FX3 a south-seeking pole is produced whereas at the air gap AG adjacent each of the winding portions FX2 and FX4 a north-seeking pole is produced. The magnetic polarity is indicated by the letters N or S as the case may be.

The rotor core RC provides a plurality flux paths for the magnetic field generated by energization of the exciter primary winding FX resulting in a magnetic flux linkage with the respective winding portions FF1 and FF2 of the feedback winding FF. A change of such magnetic flux linkage would cause an EMF to be induced into the respective winding portions FF1 and FF2. However, from a study of FIGS. 3a and 3b, it will be appreciated that the net change of the magnetic flux linkage is zero. For instance, in FIG. 3a, the portions of the rotor core RC extending between the slots RS2 and RS6 across which the winding portion FF2 is wound overlaps the portion of the stator core SC between the slots SS4 and SS8 which thus serves as a flux path for magnetic flux due to the pole pair generated by the winding portions FX3 and FX4 as denoted by the arrows MX3 and MX4. With movement of the rotor core RC relative to the stator core SC, the same portion of the rotor core RC overlaps a different portion of the stator core SC, as indicated by FIG. 3b so that part of the flux denoted as MX4 and due to the winding portion FX4 ceases to take the flux path across which the winding portion FF2 is wound but is replaced by parts of the magnetic flux denoted by MX2 and due to the winding portion FX2 having coresponding direction and strength. Similar effects occur with further movement of the rotor core RC relative to the stator core SC so that there is no nett change of magnetic flux linkage between the respective winding portions FF1 and FF2 and the magnetic field due to the exciter primary winding FX with rotation of the rotor core RC relative to the stator core SC.

Figure 4:
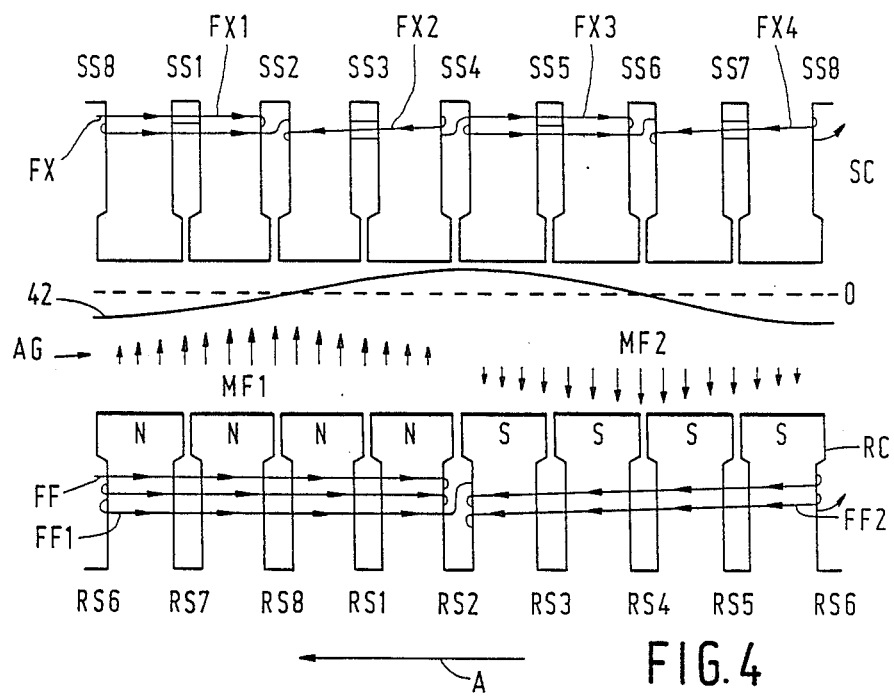

FIG. 4 diagrammatically illustrates the relationship between the exciter primary winding FX and the magnetic field produced by the feedback winding FF. In FIG. 4, relevant parts of the stator core SC with the winding portions of the exciter primary winding FX wound thereon and of the rotor core RC with the winding portions of the feedback winding FF wound thereon are depicted in a generally similar manner to that of FIG. 3 (a). Here, the direction and strength of the magnetic field generated in the air gap AG due to the energization of the feedback winding FF at distributed points along the air gap AG is denoted by the groups of arrows MF1 and MF2. By energization of the feedback winding FF, at the air gap AG adjacent the winding portion FF1 a north-seeking pole is produced whereas at the winding portion FF2 a south-seeking pole is produced. The magnetic polarity is indicated by the letters N or S as the case may be.

In this case, the stator core SC provides a plurality of flux paths whereby the magnetic field generated by energization of the feedback winding FF results in magnetic flux linkage with the respective winding portions FX1, FX2, FX3 and FX4 and a change of such magnetic flux linkage will cause an EMF to be induced into the respective winding portions FX1, FX2, FX3 and FX4. It is assumed the rotor core RC moves at a constant speed reelative to the stator core RC in the direction indicated by the arrow A. The magnetic field denoted by the groups of arrows MF1 and MF2 is fixed relative to the rotor core RC. Accordingly, an alternating voltage is induced into each of the winding portions FX1, FX2, FX3 and FX4 with rotation of the rotor core RC. The curve 42 indicates the rate and direction of change of magnetic flux along the air gap AG relative to the stator core SC due to the rotating magnetic field denoted by the groups of arrows MF1 and MF2 at the instant of time depicted by the Figure. From the shape of the curve 42 in relation to the zero reference line 0 it will be understood that an alternating voltage is induced into the winding portion FX1 which is equal to and 180° out of phase with an alternating voltage induced into the winding portion FX2 and that an alternating voltage is induced into the winding portion FX2 which is equal to and 180° out of phase with an alternating voltage induced into the winding portion FX4. Since the winding portions FX1, FX2, FX3 and FX4 are all connected in series, the voltages so induced into the windings FX1 and FX3 cancel each other across the exciter winding FX and the voltages so induced into the windings FX2 and FX4 likewise cancel each other across the exciter winding FX.

Figure 5:
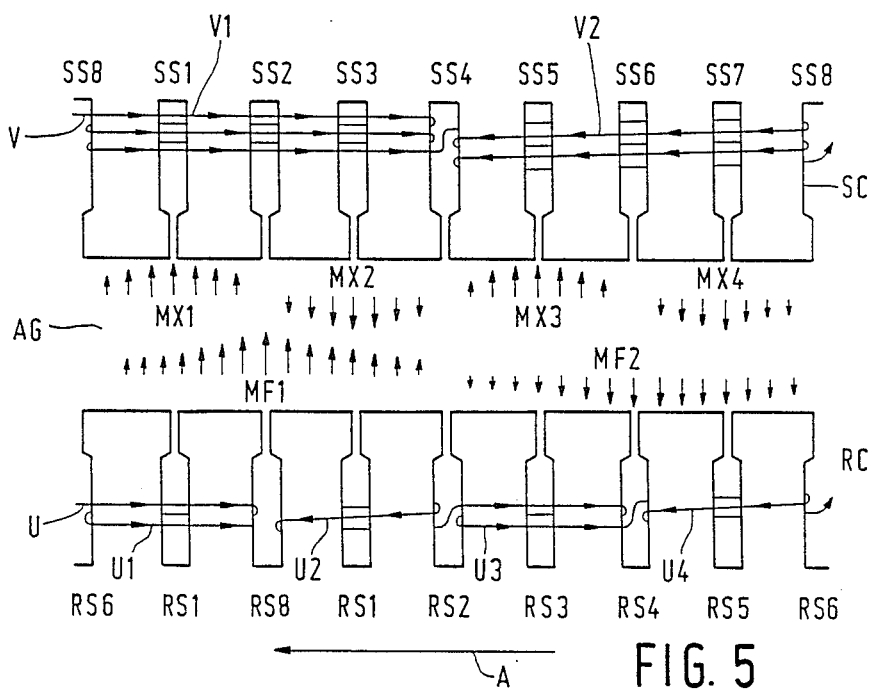

FIG. 5 diagrammatically illustrates the relationships between the exciter secondary winding U and the combined magnetic field produced by the exciter primary winding FX and by the feedback primary winding FF and the relationships between the feedback secondary winding V and the same combined magnetic field.

In FIG. 5, although the winding portions FX1, FX2, FX3 and FX4 of the exciter primary winding FX is not shown, the magnetic field due to those winding portions are denoted by the groups of arrows MX1, MX2, MX3 and MX4 in similar manner to FIG. 3. Of course, the magnetic field represented by the groups MX1, MX2, MX3 and MX4 are fixed relative to the stator core SC. Likewise, although the winding portions FF1 and FF2 of the feedback winding FF are not shown the magnetic field due to those winding portions are denoted by the groups of arrows MF1 and MF2 in similar manner to FIG. 4. Of course, the magnetic field represented by the groups MF1 and MF2 are fixed relative to the rotor core RC which moves relative to the stator core SC in a direction indicated by the arrow A. In FIG. 5, the exciter secondary winding U and the relative winding sense of each winding portions U1, U2, U3 and U4 on the rotor core RC is shown and the feedback secondary winding V and the relative winding sense of each winding portions V1 and V2 on the stator core SC is shown.

Assuming rotation of the rotor core RC at a constant speed, the movement of the magnetic field denoted by the arrow groups MF1 and MF2 relative to the stator core SC causes an alternating voltage to be induced into each of the winding portions V1 and V2 owing to the change of magnetic flux linking with the respective winding portions V1 and V2. At any given instant, the change in magnetic flux due to the magnetic field of the winding FF linking with the winding portion V1 is equal and of opposite direction to that linking with the winding portion V2. As the winding sense of the winding portion V1 is opposite to that of the winding portion V2 and the two winding portions are connected in series in the manner illustrated, the alternating voltage so induced into the winding portion V1 is in phase with the alternating voltage so induced into the winding portion V2 and the in-phase sum of the two induced voltages is developed across the winding V.

Simultaneously, the movement of the magnetic field denoted by the arrow groups MX1, MX2, MX3 and MX4 relative to the rotor core RC causes an alternating voltage to be induced into each of the winding portions U1, U2, U3 and U4 owing to the change of magnetic flux linking with the respective winding portions and at any given instant the change in magnetic flux due to the magnetic field of the exciter primary winding FX linking with the winding portion U1 is equal and of opposite direction to that linking with the winding portion U2 whereas that linking with the winding portion U3 is equal and of opposite direction to that linking with the winding portion U4. As the winding sense of the winding portion U1 is opposite to that of the winding portions U2 and the winding sense of the winding portion U3 is opposite to that of the winding portion U4 and the four winding portions are connected in series with each other in the manner illustrated, the alternating voltages so induced into the respective winding portions are in phase and the in-phase sum of the four induced alternating voltages is developed across the winding U.

The foregoing description in relation to FIG. 5 makes no reference to the simultaneous presence in the air gap AG of the magnetic field due to the exciter primary FX and that due to feedback primary winding FF.

Having regard to the purpose of the feedback secondary winding V, it is evident that, at any given location along the air gap AG, the strength of the magnetic field due to the feedback primary winding FF, as represented by the arrow groups MF1 and MF2, will be periodically reinforced or opposed by the magnetic field due to the exciter primary winding as represented by the arrow groups MX1, MX2, MX3 and MX4 with rotation of the rotor core RC. It must also be kept in mind that all four of the windings FX, FF, V and U form part of the same feedback system of the alternator, in which system the strength of the magnetic field due to the exciter primary winding FX and that due to the feedback winding FF are subject to variation for compensation purposes. Such periodic reinforcement and opposition, itself subject to such variation, causes further local change of magnetic flux linking with the respective winding portions V and V2 and is a potential cause of undesirable voltages being induced into the winding V. However, with the winding portions V1 and V2 of the feedback secondary winding V being provided in accordance with a preferred form of the present invention as illustrated by FIG. 5, there is no nett change of the magnetic flux linking with the respective winding portions V1 and V2 due to the magnetic field of the primary exciter winding FX and accordingly no undesirable voltages due to the such periodic reinforcement and opposition are induced into the respective winding portions V1 and V2.

Having regard to the purpose of the exciter secondary winding U, it is likewise evident that, at any given location along the air gap AG, the strength of the magnetic field due to the exciter primary winding FX, as represented by the arrow groups MX1, MX2, MX3 and MX4 will also be periodically reinforced or opposed by the magnetic field due to the feedback primary winding FF, as represented by the arrow groups MF1, and MF2 with rotation of the rotor core RC. The magnitude of such periodic reinforcement and opposition is subject to variation for the reasons previously explained. Likewise, such periodic reinforcement and opposition causes further local change of magnetic flux linking with the respective winding portions U1, U2, U3 and U4 may indeed cause unwanted voltages to be induced into these respective winding portions. However, with the winding portions U1, U2, U3 and U4 of the exciter secondary winding U, being provided in accordance with a further preferred form of the present invention, as illustrated by FIG. 5, mutual cancellation of the unwanted induced voltages occurs. That is to say, with regard to the magnetic flux represented by the arrow groups MF1 and MF2, the winding portions U2 and U3 are both wound on one flux path and the winding portions U1 and U4 are both wound on another flux path. The winding portion U2 matches with the winding U3 and is connected in series therewith whereas the winding portion U1 matches with the winding portion U4 and is connected in series therewith. A change of magnetic flux linkage with the exciter secondary winding U due to the magnetic field represented by the arrow groups MF1 and MF2 causes an unwanted voltages to be induced into all four of the winding portions U1, U2, U3 and U4. However, the voltages induced into the respective winding portions U1 and U4 are of equal magnitude and 180° out of phase and the voltages induced into the respective winding portions U2 and U3 are also of equal magnitude and 180° out of phase. Since all four of the winding portions are connected in series the voltages induced into the winding portion U1 cancels the voltage induced into the winding portion U4 and the voltage induced into the winding portion U2 cancels the voltage induced into the winding portion U3 with the result that no unwanted induced voltage due to the magnetic field represented by the arrow groups MF1 and MF2 is developed across the exciter secondary winding U.

With the self-excited alternator described in relation to FIGS. 2, 3, 4 and 5, it will be appreciated that the feedback primary winding FF in association with the rotor core RC provides K feedback pole pairs (ie. a single feedback pole pair) and the primary exciter winding FX in association with the stator core SC produces NK exciter pole pairs (ie. two exciter pole pairs) where, in this case, K=1 and N=2 whereas the feedback secondary winding in association with the stator core SC forms K similar flux paths (ie. a single flux path) linking with the single feedback pole pair and the exciter secondary winding U in association with the rotor core RC forms NK flux paths (ie. two flux paths) linking with the two exciter pole pairs.

Employing similar principles to those of the alternator described in relation to FIGS. 2, 3, 4 and 5, self-excited alternators may be constructed in accordance with the invention in which K is larger than 1 and N is larger than 2.

The self-excited alternator described in relation to FIGS. 2, 3, 4 and 5 has only one feedback secondary winding V and only one exciter secondary winding U. A self-excited alternator in accordance with the invention may, if required, be provided having more than one feedback secondary winding and, if required, more than one exciter secondary winding. However, it is advantageous for each feedback secondary winding and each exciter secondary winding so provided to be arranged in association with either the common rotor core or the common stator core, as the case may be, in accordance with the preferred forms of the invention described herein.

What is claimed is:

1. A self-excited alternator of the brushless type, having a rotating field which is excited by an alternating current exciter whose rotating armature is mounted to rotate with the rotating field winding of the alternator and is permanently connected to the field winding of the alternator via field rectifier means also mounted to rotate with the field winding wherein the exciter has an exciter stator primary winding and a rotary exciter secondary winding connected via rotary field rectifier means to the rotary main field winding of the alternator, primary excitation direct current for the exciter being derived, via magnetic coupling, from a rotary auxiliary magnetic field produced by a feedback primary winding connected in series with the main field winding and mounted to rotate therewith, and wherein a common magnetic circuit is used for coupling the feedback primary winding with a feedback secondary winding and for coupling the exciter primary and secondary windings, the common magnetic circuit comprising a common stator core on which the exciter primary winding and the auxiliary secondary winding are provided and a common rotor core on which the exciter secondary winding and the feedback winding are provided, the rotor core being so shaped and the feedback winding being so provided thereon that in operation a pole group having either K or NK feedback pole pairs is formed with poles uniformly disposed around the rotor core and the stator core being so shaped and the exciter winding being so provided thereon that in operation a pole group having either NK or K exciter pole pairs are formed with poles uniformly disposed around the stator core, the ratio of feedback pole pairs to exciter pole pairs being either K to NK or NK to K, where K is any number and N is an even number, either the feedback winding or the exciter primary winding, as the case may be, for forming the pole group having K pole pairs comprising one or more first winding portions wound for generating the poles of that group whereby, with rotation of the rotor core relative to the stator core, the net change of magnetic flux linking with each first winding portion and due to the pole group having NK pole pairs is substantially zero.

2. A self-excited alternator as claimed in claim 1 wherein the feedback winding or the exciter primary winding, as the case may be, for forming the pole group having NK pole pairs comprises a plurality of second winding portions wound for generating the poles of that group in such a manner that each pole of that group is energized by one or more second winding portions, the plurality of second winding portions being in pairs of serially-connected matched winding portions, respective second winding portions of each such pair being wound for generating different pole pairs of that group so disposed in relation to each other that, with rotation of the rotor core relative to the stator core, voltages induced into respective second winding portions of each such pair due to the magnetic field of the pole group having K pole pairs are equal and in anti-phase and thereby mutually cancel across each pair.

3. A self-excited alternator as claimed in claim 1 wherein the feedback winding in association with the rotor core forms the pole group having K pole pairs and the stator core is shaped so as to define K similar flux paths uniformly disposed around the stator core for providing flux linkage between opposite poles of the K feedback pole pairs and the feedback secondary winding, the feedback secondary winding portions each so coupled to a flux path that an alternating voltage is induced into each feedback secondary winding portion upon rotation of the rotor core relative to the stator core due to the magnetic field of the pole group having K feedback pole pairs whereas the net change of magnetic flux linking with each feedback secondary winding portion and due to the pole group having NK exciter pole pairs is substantially zero.

4. A self excited alternator as claimed in claim 1 wherein the feedback winding in association with the rotor core forms the said pole group having NK pole pairs and the stator core is shaped so as to define NK similar flux paths uniformly disposed around the stator core for providing flux linkage between opposite poles of the NK feedback pole pairs and the feedback secondary winding, the feedback secondary winding comprising a plurality of pairs of serially-connected matched feedback winding portions, respective feedback winding portions of each such pair being coupled to one or more given flux paths so disposed in relation to each other that, with rotation of the rotor core relative to the stator core, alternating voltages induced into respective feedback winding portions by magnetic flux due to the feedback pole pairs are mutually reinforcing whereas variations of the total magnetic flux strength in each given flux path owing to the alternate weakening and strengthening of magnetic flux due to the NK feedback pole pairs by magnetic flux due to the N exciter pole pairs produces equal and opposite voltage variations in respective matched feedback winding portions of each such pair which mutually cancel across each such pair.

5. A self-excited alternator as claimed in claim 1 wherein the exciter primary winding in association with the stator core forms the said pole group having K pole pairs and the rotor core is shaped so as to define K similar flux paths uniformly disposed around the rotor core for providing flux linkage between opposite poles of the K exciter pole pairs and the exciter secondary winding, the exciter secondary winding comprising one or more exciter secondary winding portions each so coupled to a flux path alternating voltage is induced into each exciter secondary winding portion upon rotation of the rotor core relative to the stator core due to the magnetic field of the pole group having K exciter pole pairs whereas the net change of magnetic flux linking with each exciter secondary winding portion and due to the pole group having NK feedback pole pairs is substantially zero.

6. A self-excited alternator as claimed in claim 1 wherein the exciter primary winding in association with the stator core forms the pole group having NK pole pairs and the rotor core is shaped so as to define NK similar flux paths uniformly disposed around the rotor core for providing flux linkage between opposite poles of the NK feedback pole pairs and the exciter secondary winding, the exciter secondary winding comprising a plurality of pairs of serially-connected matched exciter secondary winding portions, respective exciter secondary winding portions of each such pair being coupled to one or more given flux paths so disposed in relation to each other that, with rotation of the rotor core relative to the stator core, alternating voltages induced into respective exciter secondary winding portions by magnetic flux due to the exciter pole pairs are mutually reinforcing whereas variations of the total magnetic flux strength in each given flux path owing to the alternate weakening and strengthening of magnetic flux due to the NK exciter pole pairs by magnetic flux due to the N exciter pole pairs produces equal and opposite voltage variations in respective matched auxiliary winding portions of each such pair which mutually cancel across each such pair.

* * * * *